United States Patent [19]

Takahashi et al.

[11] Patent Number: 5,481,056
[45] Date of Patent: Jan. 2, 1996

[54] PROCESS FOR THE PREPARATION OF POLYOLEFINS

[75] Inventors: Fumiharu Takahashi, Yokkaichishi; Yutaka Naito, Mie; Mitsuhiro Mori, Aichi; Sadaki Nishimura, Yokkaichi, all of Japan

[73] Assignee: Tosoh Corporation, Shinnanyo, Japan

[21] Appl. No.: 93,679

[22] Filed: Jul. 20, 1993

[30] Foreign Application Priority Data

Jul. 21, 1992 [JP] Japan .................. 4-214764
Jul. 21, 1992 [JP] Japan .................. 4-214765

[51] Int. Cl.⁶ .................................. C07C 2/22
[52] U.S. Cl. .................. 585/512; 585/520; 585/523
[58] Field of Search .............................. 585/512, 520, 585/522, 523

[56] References Cited

U.S. PATENT DOCUMENTS

| | | | |
|---|---|---|---|
| 3,933,934 | 1/1976 | Bailly et al. ........................ | 585/522 |
| 4,618,596 | 10/1986 | Agapiou et al. ..................... | 502/116 |
| 4,711,865 | 12/1987 | Speca ................................. | 502/116 |
| 5,034,484 | 7/1991 | Demiddeleer et al. ............... | 526/119 |
| 5,118,769 | 6/1992 | Kondo et al. ........................ | 528/128 |

*Primary Examiner*—P. Achutamurthy
*Attorney, Agent, or Firm*—Oblon, Spivak, McClelland, Maier, & Neustadt

[57] ABSTRACT

This invention relates to a process for the polymerization of polyolefins, in which α-olefins are polymerized in the presence of a catalyst system composed of: the solid catalyst component (A) obtained by reacting a magnesium compound with oxygen-containing organic compounds of a transition metal, aluminum and silicon, followed by further reacting with a halogenated organoaluminum compound, and the catalyst component (B) comprising of organoaluminum compound and/or organoaluminoxane compound. The catalyst system of this invention provides polymers having an excellent particle form and the molecular weight distribution being easily controlled in a wide range, in high activity, and copolymers having a narrow composition distribution range.

6 Claims, No Drawings

PROCESS FOR THE PREPARATION OF POLYOLEFINS

BACKGROUND OF THE INVENTION

1. Field of the Invention

The present invention relates to a process for preparing polyolefins. In particular, the present invention relates to a process for preparing polyolefins by the polymerization of an α-olefin with a catalyst which exhibits an excellent polymerization activity to obtain a polyolefin with a desired controlled molecular weight distribution. Further, it relates to a process for preparing polyolefins, providing polyolefin polymers having good particle form and excellent powder characteristics, and olefin copolymers having a good transparency and excellent melt properties such as melt tension.

2. Description of the Prior Art

As a method for producing polyolefins by polymerization of olefins, it has been known to use a catalyst system comprising a combination of transition metal compounds and organometallic compounds. Furthermore, recently numerous methods have been proposed for preparing polyolefins in the presence of catalyst components, for example, comprising solid catalyst components which mainly consist of magnesium, titanium and halogens using magnesium chloride and titanium tetrachloride, and organometallic compounds as highly active catalysts. However, such catalyst systems which mainly consist of titanium compounds are limited to controlling the molecular weight distribution of the resulting polymer. Accordingly, there has been a demand for catalysts which can control the molecular weight distributions of polyolefins arbitrarily depending on the variation of their quality.

Japanese Patent Publication No. 39714/1977 has already disclosed a method for polymerization which can provide polyolefins having an arbitrary molecular weight distribution by using a catalyst system maintaining a high activity comprising an organometallic compound and a reaction product of metallic magnesium, a hydroxylated organic compound, an organic oxygen compound of a transition metal, a halogen-containing compound of a transition metal and an aluminum halide.

In this Japanese Patent Publication, there is disclosed a method of preparing catalysts having no problems in control of moisture and corrosion of the preparation apparatus used in the preparation of the catalyst component and having many industrial advantages, due to using metallic magnesium which is relatively easily treated compared to magnesium chloride or titanium tetrachloride, hydroxylated organic compounds such as metallic magnesium and alcohols and organic oxygen compounds of transition metals such as titanium tetrabutoxide. However, the catalyst system of this publication is not sufficient in polymerization activity, and consequently, there is still room for improvement in this method.

In addition, in case where an ethylene-α-olefin copolymer is prepared using the catalyst system of this Japanese Patent Publication, the composition distribution range is broad, and therefore, many α-olefin units incorporated in the polymer may exist in the low molecular weight side, resulting in stickiness, inferiority in transparency, and other problems in properties.

Furthermore, the polymer particles obtained using this catalyst systems have a small average particle diameters as well as a broad particle size distribution, and consequently the proportion of fine particles in the polymer particles becomes large. Therefore, such polymer particles have insufficient powder characteristics.

On the other hand, Japanese Patent Application Laid-open No. 19309/1983 discloses a process for copolymerization of one or more of $C_3$–$C_{12}$ α-olefins with ethylene in the presence of a catalyst composed of a transition metal-containing compound having the general formula:

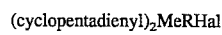

in which R represents a cyclopentadienyl, a $C_1$–$C_6$ alkyl group or a halogen, Me represents a transition meal, and Hal represents a halogen; and a linear or cyclic aluminoxane having the general formulae:

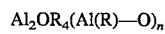

for a linear aluminoxane, and

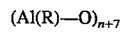

for a cyclic aluminoxane in which n is a number of 4 to 20 and R represents a methyl group or ethyl group.

In this publication, it is disclosed that the copolymerization of ethylene and α-olefin carried out in the presence of, for example, methyl aluminoxane and bis(cyclopentadienyl)zirconium dichloride can provide an ethylene α-olefin copolymers having an arbitrary composition while maintaining a high polymerization activity.

Such catalysts composed of transition metal compounds and aluminoxanes are remarkably superior in polymerization activity and copolymerization activity to the conventional Ziegler-Natta catalyst. However, most of such catalyst systems are soluble in the reaction system. Therefore, in slurry polymerization or gas phase polymerization the bulk density of the polymers obtained by using such catalyst systems is small and inferior in powder characteristics. In view of such problems, there is a demand for a solid catalysts on which the above-mentioned transition metal compounds are fixed.

On the other hand, numerous other methods have been proposed in Japanese Patent Application Laid-open No. 35006/1985, for instance, in which the catalyst system to be used is composed of a solid catalyst component in which said transition metal compound is fixed on a porous inorganic oxide carrier such as silica, silica-alumina, etc. and an aluminoxane. In such methods, however, the polymerization activity becomes remarkably lower. Furthermore, most of the polymers obtained by using such method contain much fine powders, resulting in insufficient powder characteristics, such as bulk density. In addition, there has been a problem that the screen mesh of the extruder may become blocked with silica present in the produced polymers, resulting in lowering of processability.

On the other hand, when said transition metal compounds are fixed on chlorine-containing compounds such as magnesium chloride, there is a possibility of inactivation of said transition metal compounds since the carrier itself is acidic. Furthermore, obviating corrosion of the preparation apparatuses has also been required.

SUMMARY OF THE INVENTION

An object of the present invention is to provide a catalyst system which can provide polymers having excellent particle form and whose molecular weight distribution can be controlled over a wide range, the catalyst evincing high activity, and to provide copolymers which have a narrow particle distribution range.

DETAILED DESCRIPTION OF THE INVENTION

The present invention provides for a process for preparing a catalyst having no problem in control of the moisture and corrosion of the preparation apparatuses during the preparation of the catalyst components, by using metallic magnesium, hydroxylated organic compounds such as alcohols and organic oxygen compounds of transition metal such as titanium tetrabutoxide. As a result, the inventors have found a surprising catalyst system which exhibits an extremely high activity and in which the molecular weight distribution of a polyolefin prepared therewith can be controlled, as well as in which the particle distribution in the copolymerization can be controlled.

The present invention provides:

(1) a process for preparing polyolefins in the presence of a catalyst composed of a transition metal compound and an organometallic compound, wherein at least one kind of α-olefin is polymerized in the presence of a catalyst system composed of:

component (A) which is a solid catalyst obtained by preparing a homogenous solution containing (i) at least one member selected from the group consisting of (a) metallic magnesium and a hydroxylated organic compound, and (b) an oxygen-containing organic compound of magnesium, and (ii) at least one kind of oxygen-containing organic compound of transition metal; adding (iii) at least one kind of compound of transition metal containing cyclopentadienyls as ligand thereto; and then reacting (iv) with at least one kind of halogenated organoaluminum compound; and component (B) comprising an organoaluminum compound and/or an organoaluminumoxy compound;

(2) a process for preparing polyolefins in which at least one kind of silicic compound is further added together with component (iii) used in the preparation of said solid catalyst component (A);

(3) a process for preparing a polyolefin in which the transition metal in component (ii) used in the preparation of said solid catalyst component (A), is zirconium;

(4) a process for preparing a polyolefin in which (v) at least one kind of organoaluminoxy compound is further added to said solid catalyst component (A); and (5) a process for preparing a polyolefin in which at least one kind of oxygen-containing organic compound of aluminum or silicon is used instead of component (ii) used in the preparation of said solid catalyst component (A).

As the method for preparing the solid catalyst component (A) according to the present invention, there can be applied a method in which a magnesium compound is reacted with an oxygen-containing compound of a transition metal, aluminum or silicon, followed by further reacting with a halogenated organoaluminum compound.

More in detail, the solid catalyst component (A) can be obtained by: preparing a homogeneous solution containing (i) at least one member selected from the group consisting of (a) metallic magnesium and a hydroxylated organic compound and (b) an oxygen-containing organic compound of magnesium, (ii) at least one kind of compound selected from the group consisting of organic compounds and halogen-containing compounds of a transition metal, aluminum, silicon, and silicic compound which is used for improvement of the polymer morphology; adding (iii) at least one kind of compound of a transition metal containing cyclopentadienyls as ligand thereto; and then reacting (v) with at least one kind of halogenated organoaluminum compound.

The solid catalyst component (A) of the present invention can also be obtained by: preparing a homogenous solution containing (i) at least one member selected from the group consisting of (a) metallic magnesium and a hydroxylated organic compound, and (b) an oxygen-containing organic compound of magnesium, (ii) at least one kind of compound selected from the group consisting of oxygen-containing organic compounds and halogen-containing compounds of zirconium, aluminum and silicon, and a silicic compound which is used for improvement of the polymer morphology; reacting at least one kind of halogenated organoaluminum compound (iv) with the resulting solution to give a solid component; and then fixing at least one kind of compound of transition metal containing cyclopentadienyls (iii) as ligand.

The process for preparing the solid catalyst component (A) is illustrated in detail as follows:

As the metallic magnesium and hydroxylated organic compounds and oxygen-containing organic compounds of magnesium of said (i) as reactants used in the preparation of the solid catalysts component (A) in the present invention, there can be employed the following compounds:

At first, in case where metallic magnesium and a hydroxylated organic compound are used, metallic magnesium to be used may take any form of the powdery, particulate, foil-like and ribbon-like forms. In such case, the suitable hydroxylated organic compounds to be used are alcohols, organosilanols and phenols.

The suitable alcohols to be used are straight-chain or branched aliphatic alcohols, alicyclic alcohols and aromatic alcohols, each having 1 to 18 carbon atoms. Examples of such alcohols include methanol, ethanol, n-propanol, i-propanol, n-butanol, i-butanol, n-hexanol, 2-ethylhexanol, n-octanol, i-octanol, n-stearylalcohol, cyclopentanol, cyclohexanol, ethylene glycol, and so on.

The suitable organosilanols to be used should have at least one hydroxyl group, and the organic group in the organosilanols is selected from the group consisting of alkyl group, cycloalkyl groups, arylalkyl groups, aryl groups, alkylaryl groups and aromatic groups, each having 1 to 12 carbon atoms, preferably 1 to 6 carbon atoms. Examples of such organosilanols include trimethylsilanol, triethylsilanol, triphenylsilanol, t-butyldimethylsilanol, and so on.

Examples of suitable phenols to be used include phenol, cresol, xylenol, hydroquinone, and so on.

These hydroxylated organic compounds may be used singly or in mixtures of two or more of them. The use of the mixtures sometimes shows specific effects on the powder characteristics of polymers.

In addition, in case where metallic magnesium is used to obtain the solid catalyst component (A) of the present invention, it is preferable to add substances which can react with metallic magnesium or which can produce adducts with metallic magnesium, such as polar substances including iodine, mercury (II) chloride, alkyl halides, organic acid esters and organic acids singly or in combination of two or more of them, in order to enhance the reaction.

Next, the compound belonging to the oxygen-containing organic compounds of magnesium to be used are magnesium alkoxides such as methylate, ethylate, isopropylate, denanolate, methoxyethylate and cyclohexanolate; magnesium alkylalkoxides such as ethylethylate; magnesium hydroalkoxides such as hydroxymethylate; magnesium phenoxides such as phenate, naphthenate, phenanthrenate and cresolate; magnesium carboxylates such as acetate, stearate, benzoate, phenylacetate, adipate, sebacate, phthalate, acrylate and oleate; oxymates such as butyloxymate, dimethylglyoxymate and cyclohexyloxymate; hydroxamates; hydroxylamines such as N-ethorose-N-phenyl-hydroxylamine derivatives; enolates such as acetylacetonate; magnesium silanolates such as triphenylsilanolate; and complex alkoxides of magnesium and other metals such as $Mg[Al(OC_2H_5)_4]_2$. Such oxygen-containing organic compounds of magnesium are used singly or in mixtures of two or more of them.

As the oxygen-containing organic compounds of a transition metal to be used as said reactant (ii), there can be employed compounds represented by the general formula $$(Me^1O_a(OR^1)_bX^1_c)_m$$

In this formula, $Me^1$ represents a transition metal of Group IVa, Va, or VIa in the Periodic Table, such as titanium, zirconium, hafnium, chromium and vanadium. Among these, titanium and zirconium are especially preferable.

$R^1$ in the formula represents a hydrocarbon group such as a straight-chain or branched alkyl, cycloalkyl, arylalkyl, aryl and alkylaryl groups having 1 to 20 carbon atoms, preferably 1 to 10 carbon atoms.

$X^1$ in the formula represents a halogen atom such as fluorine, chlorine, bromine and iodine.

a, b and c are number such that b>0 and 4>c≧0 at a≧0 and compatible with the atomic valency of the transition metal, and m is an integer. It is preferable to use an oxygen-containing organic compound in which m is 1≦m≦6 at a being 0≦a≦1.

Specific examples of such compounds include tetraethoxy titanium, tetrapropoxy titanium, tetraisopropoxy titanium, tetrabutoxy titanium, $Ti_2O(O\text{—}i\text{—}C_3H_7)_6$, and so on.

Another transition metal compounds can also be used, in which the transition metal zirconium replaces titanium in the above titanium compounds. In addition, the use of oxygen-containing organic compounds having different kind of hydrocarbon groups also is included in the scope of the present invention. These oxygen-containing organic compounds of transition metals are used singly or in mixtures of two or more of them.

As the halogen-containing compounds of zirconium they include halides, i.e., there can be employed $ZrF_4$, $ZrCl_4$, etc.; oxyhalides such as $ZrOF_2$, $ZrOCl_2$, etc.; halogenalkoxides such as $Zr(O\text{—}n\text{—}C_4H_3)Cl_3$, $Zr(O\text{—}n\text{—}C_4H_3)_2Cl_2$, $Zr(OC_2H_5)_3C_1$, $Zr(O\text{—}i\text{—}C_3H_7)Cl_3$, $Zr(O\text{—}n\text{—}C_3H_7)Cl_3$, etc. In addition, the halogen-containing compounds of zirconium containing different kinds of organic groups are also included in the scope of the present invention.

As the oxygen-containing organic compounds of aluminum to be used as said reactant (ii), there can be employed the compounds represented by the general formula:

$$Ai(OR^2)_dX^2_{d-4}$$

in which $R^1$ represents a hydrocarbon group such as a straight-chain or branched alkyl, cycloalkyl, arylalkyl, aryl and alkylaryl groups having 1 to 20 carbon atoms, preferably 1 to 10, carbon atoms; d is a number of 0<d≦3; $X^2$ represents a halogen atom.

Specific examples of such oxygen-containing organic compounds of aluminum include trimethoxyaluminum, triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexoxy) aluminum, triphenoxyaluminum, tribenzoxyaluminum, dichloromethoxyaluminum, chlorodimethoxyaluminum, dichloro(2-ethylhexoxy) aluminum, chlorodi(2-ethylhexoxy) aluminum, dichlorophenoxyaluminum, chlorodiphenoxyaluminum, and so on. The use of the oxygen-containing organic compounds having some different kinds of hydrocarbon groups is also included in the scope of the present invention. These oxygen-containing organic compounds of aluminum are used singly or in mixtures of two or more of them.

As the oxygen-containing organic compounds of silicon to be used, there can be employed the compounds represented by the general formula:

$$SiR^3_1(OR^4)_a$$

in which each of $R^3$ and $R^4$ represents a hydrocarbon group such as a straight-chain or branched alkyl, cycloalkyl, arylalkyl, aryl or alkylaryl group having 1 to 20 carbon atoms, preferably 1 to 10 carbon atoms; and 1 and n are numbers of 1≧0 and n>0 in the relation of 2≦1+n≦4.

Specific examples of such compounds include dimethyldiethoxysilane, tetramethoxysilane, tetraethoxysilane, tetra-i-propoxysilane, tetra-n-propoxysilane, tetra-n-butoxysilane, tetra-i-pentoxysilane, tetra-n-hexoxysilane, tetraphenoxysilane, tetrakis(2-ethylbutoxy) silane, tetrakis(2-ethylhexoxy) silane, tetrakis(2-methoxyethoxy) silane, methyltrimethoxysilane, ethyltrimethoxysilane, n-butyltrimethoxysilane, phenyltrimethoxysilane, vinyltrimethoxysilane, chloromethyltrimethoxysilane, 3-chloropropyltrimethoxy-silane, 4-chlorophenyltrimethoxysilane, trimethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysilane, triethoxysilane, ethyltri-i-propoxysilane, vinyltri-i-propoxysilane, i-pentyltri-n-butoxysilane, methyltri-i-pentoxysilane, ethyltri-i-pentoxysilane, methyltri-n-hexoxysilane, phenyltri-i-pentoxysilane, n-propyltrimethoxysilane, i-propyltrimethoxysilane, i-butyltrimethoxysilane, dimethyldimethoxysilane, methylphenyldimethoxysilane, diphenyldimethoxysilane, methyldimethoxysilane, dimethyldiethoxysilane, diethyldiethoxysilane, diphenyldiethoxysilane, methyldodecyldiethoxysilane, methyloctadecyldiethoxysilane, methylphenyldiethoxysilane, methyldiethoxysilane, dibenzyldiethoxysilane, diethoxysilane, dimethyl-n-butoxysilane, dimethyldi-i-pentoxysilane, diethyldi-i-pentoxysilane, di-i-butyldi-i-pentoxysilane, diphenyldi-i-pentoxysilane, diphenyldi-i-pentoxysilane, diphenyldi-n-octoxysilane, di-isobutyldimethoxysilane, trimethylmethoxysilane, trimethylethoxysilane, dimethylethoxysilane, trimethyl-i-propoxysilane, trimethyl-n-propoxysilane, trimethyl-t-butoxysilane, trimethyl-i-butoxysilane, trimethyl-n-butoxysilane, trimethyl-n-pentoxysilane, trimethylphenoxysilane, aryltriethoxysilane, etc.

Another embodiments of the compounds, in which each of $R^3$ and $R^4$ in the general formula is a hydrocarbon group containing a hetero atom, can also be employed. Examples are phenyltris(2-methoxyethoxy) silane, methyltris(N,N-dimethylamino)silane, 3-(2-methylpiperidinopropyl)-trimethoxysilane, tetrakis(2-methoxyethoxy) silane, bis(ethylmethylketosim) methylpropoxysilane, dimethoxy-3-(2-ethoxyethylthiopropyl)methylsilane, etc.

These oxygen-containing organic compounds of silicon may be used singly or in mixtures of two or more of them.

As the silicic compounds to be added together with the component (iii), there can be employed polysiloxanes and silanes described below.

That is, polysiloxanes to be used are siloxane polymers having a linear, cyclic or three dimensional structure containing one or more kinds of repeating units in various proportions and various distributions in a molecule, the repeating units being represented by the general formula:

$(SiR^5R^6O)_s$ in which each $R^5$ and $R^6$ represents independently an atom or a residue which can combine with a silicon atom, such as a hydrocarbon group, e.g., an alkyl group and an aryl group, each having 1 to 12 carbon atoms, hydrogen, a halogen, an alkoxy group, an allytoxy group, each having 1 to 12 carbon atoms and fatty acid residues; and all of $R^5$ and $R^6$ should not simultaneously be hydrogen or a halogen; and s is commonly an integer of 2 to 1,000.

Specific examples of the linear polysiloxanes include hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexa-methyltrisiloxane, 1,7-dichlorooctamethyltetrasiloxane, dimethoxypolysiloxane, diethoxypolysiloxane, diphenoxypolysiloxane, etc.

Specific examples of the cyclic polysiloxanes include hexamethylcyclotrisiloxane, octamethylcyclotrisiloxane, decamethylcyclotrisiloxane, 2,4,6-trimethylcyclotrisiloxane, 2,4,6,8-tetramethylcyclotetrasiloxane, triphenyl-trimethylcyclotrisiloxane, tetraphenyltetramethyl-cyclotetrasiloxane, hexaphenylcyclotrisiloxane, octaphenylcyclotetrasiloxane, etc.

As the polysiloxanes having a three dimensional structure, there can be employed those which are made so as to have a crosslinked structure by, for example, heating the above-mentioned linear and cyclic polysiloxanes.

These polysiloxanes are preferably a liquid in terms of treatment, and it is desirable that such polysiloxanes have a viscosity within the range of 1 to 10,000 centistokes, preferably within the range of 1 to 1,000 centistokes, at 25° C. However, the form of polysiloxane is not limited to liquid. It may be a solid collectively called a silicone grease.

As the silanes to be used, there can be employed the silicic compounds represented by the general formula:

$H_oSi_pR^7_qX^1_r$ in which each $R^7$ independently represents a residue which can combine with silicon such as a hydrocarbon group, e.g., an alkyl group, an aryl group, each having 1 to 12 carbon atoms, an alkoxy group, an allyloxy group, each having 1 to 12 carbon atoms, or a fatty acid residue; each $X^2$ independently represents a halogen atom; and each of o, q and r is an integer of 0 or more, p is a natural number of o+q+r=2p+2 or 2p.

Specific examples of silicic compounds include silahydrocarbons such as trimethylphenylsilane, dimethyldiphenylsilane allyltrimethylsilane, etc.; linear and cyclic orga- nosilanes such as hexamethyldisilane, octaphenylcyclotetrasilane, etc.; organosilanes such as methylsilane, dimethylsilane, trimethylsilane, etc.; halogenated silicon such as silicon tetrachloride, silicon tetrabromide, etc.; alkyl- and arylhalogenosilanes such as dimethyldichlorosilane, diethyldichlorosilane, n-butyltrichlorosilane, diphenyldichlorosilane, triethylfluorosilane, dimethyldibromosilane, etc.; alkoxysilanes such as trimethylmethoxysilane, dimethyldiethoxysilane, methyltrimethoxysilane, tetramethoxysilane, tetraethoxysilane, diphenyldiethoxysilane, tetramethyldiethoxysilane, dimethyl-tetraethoxydisilane, etc.; haloalkoxy- and phenoxysilanes such as dichlorododiethoxysilane, dichlorodiphenylsilane, tribromoethoxysilane, etc.; silane compounds containing fatty acids residues such as trimethylacetoxysilane, diethyldiacetoxysilane, ethyltriacetoxysilane, etc.; and so on.

Among these, the preferable compounds are linear polysiloxanes such as dimethylpolysiloxane, methylhydropolysiloxane, etc. and alkoxysilanes such as methyltrimethoxysilane, tetramethoxysilane, tetraethoxysilane, etc.

These organosilicic compounds may be used singly or in mixtures of two or more of them.

As the transition metal compounds containing cyclopentadienyls as ligand to be used as said reactant (iii), there are employed compounds represented by the general formula:

(cyclopentadienyl)$_t$Me$^2$L$_{s-t}$ in which Me$^2$ represents a transition metal; L represents a ligand other than cyclopentadienyls, which is coordinating to the transition metal, such as a hydrocarbon group, an alkoxy group, a halogen or hydrogen; t is an integer representing the coordination number of the cyclopentadienyls, and R is the atomic valency of the transition metal, such that t and u are within the range of $1 \le t \le u$, in which, if t is $t \ge 2$, two or more of cyclopentadienyl ligands may be combined with each other through a silylene group, a substituted silylene group, an alkylene group, a substituted alkylene group and sulfur.

As the transition metal is in the above general formula, there can be employed the same metals as Me$^1$. Specific examples of such transition metals include zirconium, hafnium, titanium, chromium and vanadium.

Specific examples of cyclopentadienyl ligands include cyclopentadienyl groups, indenyl groups, fluorenyl groups, and so on.

As the ligands other than cyclopentadienyls, there can be employed hydrocarbon groups such as methyl group, ethyl group, propyl group, and so on; examples of alkoxy groups such as methoxy group, ethoxy group, and so on; and halogens such as fluorine, chlorine, bromine and iodine, and so on.

Specific examples of the transition metal compounds containing cyclopentadienyls as ligand include bis(cyclopentadienyl)zirconium dichloride, bis(methylcyclopentadienyl)zirconium dichloride, bis(dimethylcyclopentadienyl)zirconium dichloride, bis(ethylcyclopentadienyl)zirconium dichloride, bis(n-propylcyclopentadienyl)zirconium dichloride, bis(n-butylcyclopentadienyl)zirconium dichloride, bis(methyl,n-butylcyclopentadienyl)zirconium dichloride, bis(cyclopentadienyl)zirconium monochloride monohydride, bis(cyclopentadienyl)methylzirconium hydride, bis(cyclopentadienyl)zirconium methoxychloride, bis(indenyl)zirconium dichloride, bis(fluorenyl)zirconium dichloride, ethylenebis(indenyl)zirconium dichloride, dimethylsilylenebis(cyclopentadienyl)zirconium dichloride, thiobis(cyclopentadienyl)zirconium dichloride, and so on.

In addition, other transition metal compounds obtained by replacing the transition metal of the above zirconium compounds with titanium, hafnium, chromium or vanadium, can also be used as such transition metal compounds.

As the halogenated organoaluminum compounds to be used as said reactant (iv), there can be employed the compounds represented by the general formula:

$R^1_xAlX^3_{3-x}$ in which $R^1$ represents a hydrocarbon group having 1 to 20 carbon atoms, preferably 1 to 8 carbon atoms; $X^3$ represents a halogen atom; and z is a number of $<z<3$, preferably $0<z\le 2$. In the formula, $R^1$ is preferably selected from the group consisting of straight-chain or branched alkyl groups, cycloalkyl groups, arylalkyl groups, aryl groups and alkylaryl groups.

Specific examples of the halogenated organoaluminum compounds include dimethylaluminum chloride, diethylaluminum chloride, diethylaluminum bromide, dipropylaluminum chloride, ethylaluminum dichloride, i-butylaluminum dichloride, methylaluminum sesquichloride, ethylaluminum sesquichloride, i-butylaluminum sesquichloride, a mixture of triethylaluminum and aluminum trichloride, and so on.

These halogenated organoaluminum compounds may be used singly or in mixtures of two or more of them.

As the organoaluminumoxy compounds used as said reactant (v), there can be employed the conventionally known aluminoxanes, such as methylaluminoxane, ethylaluminoxane, propylaluminoxane, and so on. In general, such aluminoxanes are the reaction products of water and organoaluminum compounds such as trimethylaluminum, di-isobutylaluminum hydride, ethylaluminum sesquichloride.

The order of use of said reactants (iv) and (v) is not particularly critical. That is, the halogenated organoaluminum compound as said reactant (iv) and the organoaluminumoxy compound as said reactant (v) may be used independently or used in a mixture thereof. Preferably, after reacting the halogenated organoaluminum compound, the organoaluminumoxy compound is then added thereto.

This reaction is preferably carried out in a liquid solvent. In case these reactants themselves do not exhibit liquid form under the operating condition, or in case where the amount of the liquid reactants is insufficient, the reaction should be carried out in the presence of an inert organic solvent.

As the inert organic solvent to be used, there can be employed any of inert organic solvents used in this art. Such inert organic solvents are, for example, aliphatic alicyclic or aromatic hydrocarbons, halogen derivatives thereof, or mixtures thereof. Among these, isobutane, hexane, heptane, cyclohexane, benzene, toluene, xylene and monochlorobenzene are preferably used.

The amount of the reactants to be used in the present invention is not particularly critical. However, it is desirable that the atomic ratio of Mg in the magnesium compound of said (i) per gram atom to the transition metal ($Me^1$) in the transition metal compound of said (ii) per gram atom is $0.05 \leq Mg/Me^1 \leq 100$, preferably $0.2 \leq Mg/Me^1 \leq 10$.

When the $Mg/Me^1$ value is too large over the range, it becomes difficult to obtain a homogeneous solution containing Mg and a transition metal in the catalyst preparation, or the resulting catalyst exhibits a low activity in polymerization. On the other hand, when the $Mg/Me^1$ value is too small, the activity of the catalyst becomes low, resulting in problems such as coloration of the products.

Accordingly, by employing such reactants (i) and (ii) in said $Mg/Me^1$ value range, a homogeneous solution containing Mg and a transition metal can be obtained.

On the other hand, the amount of the reactants to be used in the present invention is also not particularly critical in case where an aluminum compound is used in said (ii). However, it is desirable that the atomic ratio of Mg in the magnesium compound of said (i) per gram atom to Al in the aluminum compound of said (ii) per gram atom is $0.1 \leq Mg/Al \leq 100$, preferably $0.25 \leq Mg/Al \leq 20$. In case where a silicic compound is used in said (ii), the atomic ratio of Mg to Si is $0.05 \leq Mg/Si \leq 100$, preferably $0.2 \leq Mg/Si \leq 10$. Such aluminum compound and silicon compound may be used in a mixture thereof, preferably within the above ranges of amount.

When the Mg/Ai(Si) value is too large over the range, it becomes difficult to obtain a homogeneous solution containing Mg and Al (Si) in the catalyst preparation. On the other hand, when the Mg/Al(Si) value is too small, the activity of the resulting catalyst in polymerization becomes low.

Accordingly, by employing such reactants (i) and (ii) in said Mg/Al(Si) value range, a homogeneous solution containing Mg and Al (Si) can be obtained.

The atomic ratio of the transition metal ($Me^2$) having cyclopentadienyls as ligand of said (iii) per gram atom to the transition metal ($Me^1$) in the transition metal compound of said (ii) per gram atom, is important in terms of control of the molecular weight distribution of the resulting polyolefin. It is preferable to use the components (ii) and (iii) in an amount such that $0.01 \leq Me^2/Me^1 \leq 10$, in particular $0.05 \leq Me^2/Me^1 \leq 5$.

In the present invention the kind and amount of the halogenated organoaluminum of said (iv) to be used, should be selected adequately. That is, the catalytic properties of active species, which is produced from the oxygen-containing organic compound of transition metal of said (ii) and the compound of transition metal containing cyclopentadienyls as ligand of said (iii), are controlled according to the kind and amount of the halogenated organoaluminum compound. More specifically, the atomic ratio of Mg in the magnesium composition of said (i) per gam atom to the aluminum ($Al^1$) of the halogenated organoaluminum of said (iv) per gram atom, is $0.05 \leq Mg/Al^1 \leq 10$, preferably $0.2 \leq Mg/Al^1 \leq 5$.

The atomic ratio of aluminum ($Al^2$) in the organoaluminumoxy compound of said (v) per gram atom to the transition metal ($Me^2$) having cyclopentadienyls as ligand of said (iii) per gram atom, is $1 \leq Al^2/Me^2 \leq 1000$, preferably $10 \leq Al^2/Me^2 \leq 200$.

The reaction conditions of each reaction step are not particularly critical, but it is preferable that each reaction is carried out at −50° to 300° C., preferably 0° to 200° C., for 0.5 to 50 hours, preferably 1 to 6 hours in an inert gas atmosphere atmospheric pressure or under an elevated pressure.

The solid catalyst component (A) thus obtained can be used for polymerization in a suspended state as it is. In some cases, the component (A) may be separated from solvent. In addition, the component (A) may be heated at atmospheric pressure or under a reduced pressure the solvent removed, and dried to be used for the polymerization.

The catalyst component (B) of the present invention is an organoaluminum compound and/or an organoaluminumoxy compound, each composed of aluminum metal and an organic group.

The above organic group is typically an alkyl group, which is a straight-chain or branched alkyl group having 1 to 20 carbon atoms, such as trimethylaluminum, triethylaluminum, tri-i-butylaluminum, tri-n-butylaluminum, tri-n-decylaluminum, and so on. Among these, straight-chain or branched trialkylaluminums having 1 to 10 carbon atoms are especially preferable.

As the organoaluminum compound, there can be employed alkyl metal hydrides having an alkyl group of 1 to 20 carbon atoms, e.g., di-isobutylaluminum hydride; alkylaluminum halides having an alkyl group of 1 to 20 carbon atoms, e.g., ethylaluminum sesquichloride, diethylaluminum chloride, di-isobutylaluminum chloride; and alkylaluminum alkoxides, e.g., diethylaluminum ethoxide.

In addition, there can also be used an organoaluminum compound obtained by reacting a trialkylaluminum or a dialkylaluminum hydride having 1 to 20 carbon atoms with a diolefin having 4 to 20 atoms, e.g., isoprenylaluminum, and so on.

The above-mentioned organoaluminum compounds may be used singly or in mixtures or reactants of two or more of them.

In addition, as the organoaluminumoxy compound, there can be employed the same compounds as those of said (v).

In the present invention, polymerization of olefins can be carried out in either liquid phase or gas phase, under ordinary reaction condition of the so-called Ziegler process. That is, the polymerization is carried out continuously or batchwise at 20° to 250° C. The polymerization pressure is not particularly critical, but it is preferable that the polymerization is carried out under an elevated pressure, especially 1.5 to 2500 kg/cm$^1$G.

In case where the polymerization is carried out in a liquid phase, the presence of an inert solvent is required. Any of the inert solvents conventionally used in this art can be employed in the present invention. In particular, an alkane or a cycloalkane having 4 to 20 carbon atoms, such as isobutane, pentane, hexane and cyclohexane, is preferred.

In case where the polymerization is carried out in the gas phase, it is desirable that the solid catalyst component (A) is pre-polymerized with ethylene or α-olefin having 3 or more carbon atoms in an amount of 0.01 to 50 g per gram of the solid catalyst component (A). The contact condition with the monomer is not particularly critical, but the pre-polymerization should be carried out under a condition where oxygen, water and the like are substantially not present.

In general, the contact treatment can be carried out at the temperature range of –50° to 100° C., preferably 0° to 50° C., at atmospheric pressure or under an elevated pressure. It is preferable to make sufficient contact, in a fluidized state in case of treatment in the gas phase, or with stirring in case of treatment in the liquid phase.

The monomers to be used in the pre-polymerization are single monomer or two or more kinds of monomers. In case of pre-polymerization of two or more kinds of monomers, each monomer can be pre-polymerized successively or simultaneously.

In such pre-polymerization, the amount of the organoaluminum compound is preferably 0.1 to 1000 moles per mole of the transition metal atom in the solid catalyst component (A).

In the gas phase polymerization, as the reaction vessel to be used in the polymerization steps, any type of reaction vessels ordinarily used in this art can be employed, such as fluidized bed-type polymerization reactor and stirring vessel-type polymerization reactor. In case where a fluidized bed-type polymerization reactor is used, polymerization is carried out while maintaining the reaction system in a fluidized state by blowing a gaseous olefin and/or an inert gas into the system. In case where the stirring vessel-type polymerization reactor is used, various kinds of stirrers can be used, such as anchor-type stirrer, screw-type stirrer and ribbon-type stirrer.

The polymerization of the present invention include the homopolymerization of α-olefin as well as the copolymerization of two or more of α-olefins. Specific examples of α-olefins to be used in polymerization are ethylene, propylene, 1-butene, 1-pentene, 1-hexene, 1-octene, 4-methyl-1-pentene, and so on.

In addition in the present invention, it is possible to carry out the copolymerization using mixtures of α-olefin and dienes such as butadiene and isoprene in order to introduce double bonds into the resulting polymer. The amount of α-olefin to be used in the copolymerization should be determined depending on the density of the objective polymer. According to the present invention, it is possible to produce a polymer having a density within the range of 0.890 to 0.970 g/cm$^3$.

The polymerization procedure of the present invention can be carried out not only in a single-step polymerization carried out under one polymerization condition, but also in a multiple-step polymerization carried out under plural polymerization conditions.

In the present invention, the amount of the solid catalyst component (A) to be used is preferably the amount corresponding to 0.001 to 2.5 millimoles of transition metal atom per liter of the solvent or per liter of the reaction vessel. The solid catalyst component (A) may be used in a further higher concentration depending on the conditions.

The organoaluminum compound of the catalyst component (B) to be used is in a concentration of 0.02 to 1,000 millimoles, preferably 0.2 to 100 millimoles per liter of the solvent or per liter of the reaction vessel.

In the present invention, the molecular weight of the resulting polymer can be adjusted according to known methods, i.e., the method in which an appropriate amount of hydrogen is present in the reaction system, and the like.

As mentioned above, the process of the present invention has some characteristic features and advantages.

The first effect attained by the present invention is that there can be obtained polymers using a catalyst exhibiting extremely high polymerization activity which do not require demineralization steps for removal of the catalyst residue. Because of the high activity, the occurrence of undesired phenomena, such as coloration and odorization of the product, can be prevented, and consequently, the purification of the resulting polymer becomes unnecessary, resulting in a great economical advantage.

The second effect attained by the present invention is that, in case of copolymerization, there can be easily produced copolymers with an extremely excellent polymerization ability and having a narrow particle distribution range.

The third effect attained by the present invention is that the molecular weight distribution in the resulting polymer can easily be controlled according to the amount of reactants to be used in the catalyst production, especially the amount ratio of a halogenated organoaluminum compound of said reactant (iv). Accordingly, polymers having various powder characteristics can be easily produced.

Finally, the fourth effect attained by the present invention is that there can be produced polymers having excellent powder characteristics with high productivity. That is, according to the present invention, excellent polymer particles can be produced, i.e., the resulting polymer contains less fine particles and has a large particle diameter; and the resulting copolymer exhibits low stickiness. Therefore, in the polymerization steps, the production of adhesives in the polymerization apparatus can be prevented; and in the transfer step, troubles such as generation of bridges in the silo can be obviated; and further the granulation process can be carried out much more smoothly.

PREFERRED EMBODIMENTS OF THE INVENTION

EXAMPLES

The following examples are for illustrative purposes and are not to be construed as limiting the invention disclosed herein.

In the following examples and comparative examples, the HLMI/MI value is a ratio of the high load melt index (HLMI determined under condition F according to ASTM D-1238) to the melt index (MI determined under condition E according to ASTM D-1238) which is used as a criterion for the molecular weight distribution. It is considered that as the HLMI/MI value is small, the molecular weight distribution is narrow.

The activity is represented by the amount of the resulting polymer (g) per gram of the solid catalyst component. The average particle diameter is a value determined by plotting the results which are given by classification of polymer particles using the sieve on the probability logarithm paper, and then reading the particle diameter corresponding to 50% of the weight integrating value from the resulting approximated straight line.

The ethyl branch number was determined from the peak derived from methyl group appearing in the vicinity of 1378 cm$^1$ given by Fourier transform infrared spectroscopy (FT-IR).

The weather resistance was tested based on the accelerated exposure test (JIS A 1415) using a test piece in which 250 ppm of an antioxidant (Seenox 326M) and 250 ppm of a light stabilizer (Tinuvin 770) was added to a polymer. In the accelerated exposure test, the sunshine carbon ark light was used as the light source. The weather resistance was evaluated according to the tensile test (JIS K 6911) based on the provision 4.3 in JIS A 1411. The elongation ratio (%) according to the tensile test was determined by the following equation:

*elongation ratio (%)=*

*[(spacing between the marked points at fracture)—*

*(initial spacing between the marked points)]/*

*(initial spacing between the marked points)*

In this test, the time required to reach the elongation ratio (%) of the test piece to 50 (%) in the accelerated exposure test, is defined as the weather-resistant time required for deterioration.

Example 1

(a) Preparation of Solid Catalyst Component (A$^1$)

In a 1-liter glass flask equipped with an stirrer, 7.0 g (0.288 mole) of metallic magnesium powder and 49.0 g (0.144 mole) of titanium tetrabutoxide were charged, and then 44.4 g (0.60 mole) of n-butanol in which 0.35 g of iodine was dissolved was gradually added thereto at 90° C. for 2 hours. The mixture was further stirred at 140° C. for 2 hours under nitrogen seal while discharging the generated hydrogen gas and then 490 ml of hexane was added therein to give a Mg-Ti solution.

In another 500-ml glass flask, 96.8 g of the Mg-Ti solution (corresponding to 0.058 mole of Mg) was charged, and then 4.4 g (0.015 mole) of the bis(cyclopentadienyl)zirconium dichloride was charged thereinto, followed by dissolving completely to give a homogeneous solution. Further, in the homogeneous solution, 86 ml of hexane solution containing 0.23 mole of i-butylaluminum dichloride was added, followed by stirring at 70° C. for 1 hour. Hexane was added to the reaction product, and the resulting mixture was washed 7 times by decantation. A slurry of the solid catalyst component (A$^1$) suspended in hexane was thus obtained in this manner. A part of the slurry was collected, and the supernatant was removed therefrom, followed by drying under nitrogen atmosphere. The elementary analysis values of the resultant were 8.2 wt. % of Ti and 7.2 wt. % of Zr.

(b) Polmerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 0.31 g (1.6 millimoles) of tri-i-butylaluminum as the catalyst component (B) and the slurry containing 8.2 mg of the solid catalyst component (A$^1$) obtained in said step (a) were successively charged into the autoclave. After adjusting the inside pressure of the autoclave to 1 kg/cm$^2$G, 4 kg/cm$^2$ of hydrogen was charged, and then polymerization was carried out for 1.5 hours while adding ethylene continuously so that the inside pressure of the autoclave became 11.0 kg/cm$^1$G. After completion of the polymerization, the reaction mixture was cooled to expel the unreacted gas, and the resulting polyethylene was separated from the solvent by filtration, followed by drying, to give 201 g of polyethylene having a melt index of 0.22 g/10 min., a HLMI/MI value of 45, and a bulk density of 0.38 g/cm$^3$. The activity was 24,000 g/g.

Example 2

Polymerization

The polymerization was carried out in the same manner as Example 1, except using 11.4 mg atom (converted to aluminum atom) of methylaluminoxane instead of tri-i-butylaluminum as the catalyst component (B) and using 3.2 mg of the solid catalyst component (A$^1$).

As a result, there was obtained 338 g of polyethylene having a melt index of 1.8 g/10 min., a HLMI/MI value of 149, and a bulk density of 0.26 g/cm$^3$. The activity was 105,000 g/g.

Example 3

Polymerization

The polymerization was carried out in the same manner as Example 1, except using 4.7 mg atom (converted to aluminum atom) of methylaluminoxane and 0.08 g ( 0.4 millimole) of tri-i-butylaluminum instead of tri-i-butylaluminum as the catalyst component (B) and using 2.3 mg of the solid catalyst component (A$^1$).

As a result, there was obtained 240 g of polyethylene having a melt index of 0.85 g/10 min. a HLMI/MI value of 49. The activity was 104,000 g/g.

Example 4

(a) Pre-polymerization

The inside atmosphere of a 2-liter capacity stainless steel autoclave of the electromagnetic stirring type was sufficiently replaced by nitrogen, and 1.58 g of the solid catalyst component (A$^1$) prepared in step (a) of Example 1 suspended in 400 ml of hexane was charged thereinto. Subsequently, 0.83 g (7.3 millimoles) of triethylaluminum as the catalyst component (B) was charged into the autoclave. Then propylene was supplied while maintaining the inside temperature and the inside pressure of the autoclave at 30° C. and 1 to 2 kg/cm$^2$G, respectively, so that 4.8 g of propylene was reacted and pre-polymerized with the solid catalyst component (A$^1$). According to this procedure, 3 g of propylene per gram of the solid catalyst component (A$^1$) was taken up. Hexane was added to the reaction product, and the resulting mixture was washed 7 times by decantation, to give a pre-polymerized catalyst suspended in hexane.

(b) Polymerization

The copolymerization of ethylene and 1-butene was carried out by the gas phase method using the pre-polymerized catalyst prepared in said step (a). That is, the inside atmosphere of a 2-liter capacity stainless steel autoclave of the electromagnetic stirring type was sufficiently replaced by nitrogen, and 200 g of table salt dried at 200° C. for 30 hours was charged therein as a disperse medium for the catalyst, and the inside temperature was adjusted to 80° C. Then, 2.7 mg atom (converted to aluminum atom) of methylaluminoxane as the catalyst component (B) and 12.8 mg of the pre-polymerized catalyst prepared in said step (a) (containing 3.2 mg of the solid catalyst component ($A^1$)) were successively charged into the autoclave. After adjusting the inside pressure of the autoclave to 1 kg/cm$^2$G, 2.0 kg/cm$^2$ of hydrogen was charged. Then, polymerization was carried out for 1.5 hours while adding ethylene and butene-1 continuously so that the inside pressure of the autoclave became 19.0 kg/cm$^2$G., by adjusting butene-1/ethylene value (molar ratio) in the gas phase to 0.20. After completion of the polymerization, the reaction mixture was cooled to expel the unreacted gas to give a mixture of produced polymer and salt. Then, the mixture was washed with pure water to dissolve out the salt, followed by drying, to give a 137 g of polyethylene having a melt index of 0.26 g/10 min., a HLMI/MI value of 78, and ethyl branches of 21 (/1000 carbon atoms). The activity per gram of the solid catalyst component (A) was 43,000 g/g.

Example 5

Polymerization

The polymerization was carried out in the same manner as Example 4, except using 1.5 mg atom (converted to aluminum atom) of methylaluminoxane and 0.08 g (0.4 millimole) of tri-i-butylaluminum instead of methylaluminoxane as the catalyst component (B) and using 11.5 mg of the pre-polymerized catalyst (containing 2.9 mg of the solid catalyst component ($A^1$)).

As a result, there was obtained 121 g of polyethylene having a melt index of 0.12 g/10 min, a HLMI/MI value of 56 and ethyl branches of 23 (/1000 carbon atoms). The activity per gram of the solid catalyst component ($A^1$) was 42,000 g/g.

Example 6

(a) Preparation of Solid Catalyst Component ($A^1$)

In a 500-ml glass flask, 95.2 g of the Mg-Ti solution prepared in Example 1 (corresponding to 0.052 mole of Mg) was charged, and then 1.5 g (5.2 millimoles) of bis(cyclopentadienyl)zirconium dichloride was charged thereinto, followed by dissolving completely to give a homogeneous solution. Further, in the homogeneous solution, 77 ml of hexane solution containing 0.21 mole of i-butylaluminum dichloride was added, followed by stirring at 70° C. for 1 hour. The reaction product was added with hexane, and the resulting mixture was washed 7 times by decantation. A slurry of the solid catalyst component ($A^2$) suspended in hexane was thus obtained in this manner. A pat of the slurry was collected, and the supernatant was removed therefrom, followed by drying under a nitrogen atmosphere. The elementary analysis values of the resultant were 9.7 wt. % of Ti and 3.9 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 11.5 mg atom (converted to aluminum atom) of methylaluminoxane as the catalyst component (B) and the slurry containing 2.8 mg of the solid catalyst component ($A^2$) prepared in said step (a) were successively charged into the autoclave. After adjusting the inside pressure of the autoclave to 1 kg/cm$^2$G, 4 kg/cm$^2$ of hydrogen was charged, and then polymerization was carried out for 1.5 hours while adding ethylene continuously so that the inside pressure of the autoclave became 11.0 kg/cm$^2$G. After completion of the polymerization, the reaction mixture was cooled to expel the unreacted gas, and the resulting polyethylene was separated from the solvent by filtration, followed by drying, to give 151 g of polyethylene having a melt index of 0.70 g/10 min. and a HLMI/MI value of 84. The activity was 54,000 g/g.

Example 7

(a) Preparation of Solid Catalyst Component ($A^3$)

In a 500-ml glass flask, 92.1 g of the Mg-Ti solution prepared in Example 1 (corresponding to 0.055 mole of Mg) was charged, and then 8.2 g (0.028 mole) of the bis(cyclopentadienyl)zirconium dichloride was charged thereinto, followed by dissolving completely to give a homogeneous solution. Further, in the homogeneous solution, 82 ml of hexane solution containing 0.22 mole of i-butylaluminum dichloride was added, followed by stirring at 70° C. for 1 hour. Hexane was added to the reaction product, and the resulting mixture was washed 7 times by decantation. A slurry of the solid catalyst component ($A^3$) suspended in hexane was thus obtained in this manner. A part of the slurry was collected, and the supernatant removed therefrom, followed by drying under a nitrogen atmosphere. The elementary analysis values of the resultant were 5.6 wt. % of Ti and 9.8 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 7.3 mg atom (converted to aluminum atom) of methylaluminoxane as the catalyst component (B) and the slurry containing 3.1 mg of the solid catalyst component ($A^3$) prepared in said step (a) were successively charged into the autoclave. After adjusting the inside pressure of the autoclave to 1 kg/cm$^2$G, 4 kg/cm$^2$ of hydrogen was charged, and then polymerization was carried out for 1.5 hours while adding ethylene continuously so that the inside pressure of the autoclave became 11.0 kg/cm$^2$G. After completion of the polymerization, the reaction mixture was cooled to expel the unreacted gas, and the resulting polyethylene was separated from the solvent by filtration, followed by drying, to give 342 g of polyethylene having a melt index of 2.0 g/10 min. and a HLMI/MI value of 151. The activity was 110,000 g/g.

Comparative Example 1

(a) Preparation of Catalyst

In a 500-ml glass flask, 93.2 g of the Mg-Ti solution prepared in Example 1 (corresponding to 0.056 mole of Mg) was charged, and then 3.26 g (0.014 mole) of zirconium tetrachloride was charged thereinto. In the resulting solution, 83 ml of hexane solution containing 0.22 mole of i-butylaluminum dichloride was added, followed by stirring at 70°

C. for 1 hour. Hexane was added to the reaction product, and the resulting mixture was washed 7 times by decantation. A slurry of the catalyst component suspended in hexane was thus obtained in this manner. A part of the slurry was collected, and the supernatant was removed therefrom, followed by drying under a nitrogen atmosphere. The elementary analysis values of the resultant were 7.3 wt. % of Ti and 2.6 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 0.30 g (1.5 millimoles) of tri-i-butylaluminum as the catalyst component (B) and the slurry containing 22.3 mg of the catalyst component prepared in said step (a) were successively charged into the autoclave. After adjusting the inside pressure of the autoclave to 1 kg/cm$^2$G, 4 kg/cm$^2$ of hydrogen was charged, and then polymerization was carried out for 1.5 hours while adding ethylene continuously so that the inside pressure of the autoclave became 11.0 kg/cm$^2$G. After completion of the polymerization, the reaction mixture was cooled to expel the unreacted gas, and the resulting polyethylene was separated from the solvent by filtration, followed by drying, to give 134 g of polyethylene having a melt index of 0.25 g/10 min. and a HLMI/MI value of 60. The activity was 6,000 g/g.

Example 8

(a) Preparation of Solid Catalyst Component (A$^4$)

In a 500-ml glass flask, 97.8 g of the Mg-Ti solution prepared in Example 1 (corresponding to 0.059 mole of Mg) was charged, and then 10.3 g (0.030 mole) of bis(n-butyl-cyclopentadienyl)zirconium dichloride was charged thereinto, followed by dissolving completely to give a homogeneous solution. Further, in the homogeneous solution, 88 ml of hexane solution containing 0.24 mole of i-butylaluminum dichloride was added, followed by stirring at 70° C. for 1 hour. Hexane was added to the reaction product, and the resulting mixture was washed 7 times by decantation. A slurry of the solid catalyst component (A$^4$) suspended in hexane was thus obtained in this manner. A part of the slurry was collected, and the supernatant was removed therefrom, followed by drying under nitrogen atmosphere. The elementary analysis values of the resultant were 8.1 wt. % of Ti and 6.7 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 11.0 mg atom (converted to aluminum atom) of methylaluminoxane as the catalyst component (B) and the slurry containing 3.3 mg of the solid catalyst component (A$^4$) prepared in said step (a) were successively charged into the autoclave. After adjusting the inside pressure of the autoclave to 1 kg/cm$^2$G, 4 kg/cm$^2$ of hydrogen was charged, and then polymerization was carried out for 1.5 hours while adding ethylene continuously so that the inside pressure of the autoclave became 11.0 kg/cm$^2$G. After completion of the polymerization, the reaction mixture was cooled to expel the unreacted gas, and the resulting polyethylene was separated from the solvent by filtration, followed by drying, to give 361 g of polyethylene having a melt index of 1.6 g/10 min. and a HLMI/MI value of 118. The activity was 109,000 g/g.

Example 9

(a) Preparation of Solid Catalyst Component (A$^5$)

In a 500-ml glass flask, 90.5 g of the Mg-Ti solution prepared in Example 1 (corresponding to 0.054 mole of Mg) was charged, and then 6.8 g (0.27 mole) of bis(cyclopentadienyl)zirconium dimethyl was charged therein, followed by dissolving completely to give a homogeneous solution. Further, in the homogeneous solution, 80 ml of hexane solution containing 0.22 mole of i-butylaluminum dichloride was added, followed by stirring at 70° C. for 1 hour. Hexane was added to the reaction product, and the resulting mixture was washed 7 times by decantation. A slurry of the solid catalyst component (A$^5$) suspended in hexane was thus obtained in this manner. A part of the slurry was collected, and the supernatant was removed therefrom, followed by drying under nitrogen atmosphere. The elementary analysis values of the resultant were 7.9 wt. % of Ti and 6.5 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 11.1 mg atom (converted to aluminum atom) of methylaluminoxane as the catalyst component (B) and the slurry containing 3.4 mg of the solid catalyst component (A$^5$) prepared in said step (a) were successively charged into the autoclave. After adjusting the inside pressure of the autoclave to 1 kg/cm$^2$G, 4 kg/cm$^2$ of hydrogen was charged, and then polymerization was carried out for 1.5 hours while adding ethylene continuously so that the inside pressure of the autoclave became 11.0 kg/cm$^2$G. After completion of the polymerization, the reaction mixture was cooled to expel the unreacted gas, and the resulting polyethylene was separated from the solvent by filtration, followed by drying, to give 383 g of polyethylene having a melt index of 1.5 g/10 min. and a HLMI/MI value of 102. The activity was 113,000 g/g.

Example 10

(a) Preparation of Solid Catalyst Component (A$^6$)

In a 1-liter glass flask equipped with a stirrer, 7.0 g (0.288 mole) of metallic magnesium powder and 49.0 g (0.144 mole) of titanium tetrabutoxide were charged, and then 44.8 g (0.60 mole) of n-butanol in which 0.35 g of iodine was dissolved was gradually added thereto at 90° C. for 2 hours. The mixture was further stirred at 140° C. for 2 hours under nitrogen seal while discharging the generated hydrogen gas. After cooling the temperature to 110° C., 18 g (0.086 mole) of tetraethoxysilane and 13.2 g (0.086 mole) of tetramethoxysilane were added to the reaction solution, and then stirred at 140° C. for 2 hours, followed by adding 490 ml of hexane to give a Mg-Ti solution.

In another 500-ml glass flask, 96.8 g of the Mg-Ti solution prepared in said step (a) (corresponding to 0.058 mole of Mg) was charged, and then 4.4 g (0.015 mole) of bis(cyclopentadienyl) zirconium dichloride was charged therein, followed by dissolving completely to give a homogeneous solution. Further, in the homogeneous solution, 129 ml of hexane solution containing 0.35 mole of i-butylaluminum dichloride was added, followed by stirring at 70° C. for 1 hour. Hexane was added to the reaction product, and the resulting mixture was washed 7 times by decantation. A slurry of the solid catalyst component ($A^6$) suspended in hexane was thus obtained in this manner. A part of the slurry was collected, and the supernatant was removed therefrom, followed by drying under nitrogen atmosphere. The elementary analysis values of the resultant were 8.0 wt. % of Ti and 6.9 wt. % of Zr.

(b) Pre-polymerization

The inside atmosphere of a 2-liter capacity stainless steel autoclave of the electromagnetic stirring type was sufficiently replaced by nitrogen, and 3.15 g of the solid catalyst component ($A^6$) prepared in said step (a) suspended in 400 ml of hexane was charged thereinto. Subsequently, 1.80 g (15.8 millimoles) of triethylaluminum as the component (B) was charged into the autoclave. Then propylene was supplied while maintaining the inside temperature and the inside pressure of the autoclave at 30° C. and 1 to 2 kg/cm$^2$G, respectively, so that 31.5 g of propylene was reacted and pre-polymerized with the solid catalyst component ($A^6$). According to this procedure, 10.0 g of propylene per gram of the solid catalyst component ($A^6$) was taken up. Hexane was added to the reaction product, and the resulting mixture was washed 7 times by decantation, to give a pre-polymerized catalyst suspended in hexane.

(c) Polymerization

The copolymerization of ethylene and 1-butene was carried out by the gas phase method using the pre-polymerized catalyst prepared in said step (b). That is, the inside atmosphere of a 2-liter capacity stainless steel autoclave of the electromagnetic stirring type was sufficiently replaced by nitrogen, and 200 g of table salt dried at 200° C. for 30 hours was charged therein as a disperse medium for the catalyst, and the inside temperature was adjusted to 80° C. Then, 2.6 mg atom (converted to aluminum atom) of methylaluminoxane as the component (B) and 38.5 mg of the pre-polymerized catalyst prepared in said step (b) (containing 3.5 mg of the solid catalyst component ($A^6$)) were successively charged into the autoclave. After adjusting the inside pressure of the autoclave to 1 kg/cm$^2$G by nitrogen, 0.5 kg/cm$^2$ of hydrogen was charged. Then polymerization was carried out for 1.5 hours while adding ethylene and butene-1 continuously so that the inside pressure of the autoclave became 17.5 kg/cm$^2$G and adjusting butene-1/ethylene value (molar ratio) in the gas phase to 0.20. After completion of the polymerization, the reaction mixture was cooled to expel the unreacted gas, to give a mixture of produced polymer and salt. Then, the mixture was washed with pure water to dissolve out the salt, followed by drying, to give 169 g of polyethylene having a melt index of 0.22 g/10 min., a HLMI/MI value of 83, an average particle diameter of 340μ, a bulk density of 0.40 g/cm$^3$ and ethyl branches of 22 (/1000 carbon atoms). The activity per gram of the solid catalyst component ($A^6$) was 48,000 g/g.

Example 11

Polymerization

The gas-phase polymerization of ethylene was carried out using the pre-polymerized catalyst prepared in Example 10. That is, the inside atmosphere of a 2-liter capacity stainless steel autoclave of the electromagnetic stirring type was sufficiently replaced by nitrogen, and 200 g of table salt dried at 200° C. for 30 hours was charged therein as a disperse medium for the catalyst, and the inside temperature was adjusted to 80° C. Then, 2.3 mg atom (converted to aluminum atom) of methylaluminoxane as the component (B) and 36.3 mg of the pre-polymerized catalyst prepared in Example 10 (containing 3.3 mg of the solid catalyst component (As)) were successively charged into the autoclave. After adjusting the inside pressure of the autoclave to 1 kg/cm$^2$G by nitrogen, 2.0 kg/cm$^2$ of hydrogen was charged. Then polymerization was carried out for 1.5 hours while adding ethylene continuously so that the inside pressure of the autoclave became 19.0 kg/cm$^2$G. After completion of the polymerization, the reaction mixture was cooled to expel the unreacted gas, to give a mixture of produced polymer and salt. Then, the mixture was washed with pure water to dissolve out the salt, followed by drying, to give 169 g of polyethylene having a melt index of 1.8 g/10 min., a HLMI/MI value of 150, an average particle diameter of 380 μ and an apparent density of 0.41 g/cm$^3$. The activity per gram of the solid catalyst component (A) was 35,000 g/g.

Example 12

(a) Preparation of Solid Catalyst Component ($A^7$)

In a 1-liter glass flask equipped with a stirrer, 7.0 g (0.288 mole) of metallic magnesium powder and 49.0 g (0.144 mole) of titanium tetrabutoxide were charged, and then 44.8 g (0.60 mole) of n-butanol in which 0.35 g of iodine was dissolved was gradually added thereto at 90° C. for 2 hours. The mixture was further stirred at 140° C. for 2 hours under nitrogen seal while discharging the generated hydrogen gas. To the reaction mixture, 490 ml of hexane was added to give a Mg-Ti solution.

In another 500-ml glass flask, 92.3 g of the Mg-Ti solution (corresponding to 0.055 mole of Mg) was charged, and then 4.0 g (0.104 mole) of bis(cyclopentadienyl)-zirconium dichloride and 6.6 g of methylhydropolysiloxane (0.100 g atom of silicon; about 30 centistokes of viscosity at 25° C.) were added thereto at 45° C., followed by stirring at 70° C. for 1 hour. Further, in the mixed solution, 22 ml of hexane solution containing 0.33 mole of i-butylaluminum dichloride was added, followed by stirring at 70° C. for hour. Hexane was added to the reaction product, and the resulting mixture was washed 7 times by decantation. A slurry of the solid catalyst component ($A^7$) suspended in hexane was thus obtained in this manner. A part of the slurry was collected, and the supernatant was removed therefrom, followed by drying under nitrogen atmosphere. The elementary analysis values of the resultant were 7.6 wt. % of Ti and 5.2 wt. % of Zr.

(b) Pre-polymerization

The pre-polymerization of the solid catalyst component ($A^7$) prepared in said step (a) was carried out in the same manner as Example 10.

(c) Polymerization

The copolymerization of ethylene and -butene was carried out in the same manner as Example 0 using the pre-polymerized catalyst prepared in said step (b).

As a result, there was obtained 70 g of polyethylene having a melt index of 0.5 g/10 min., a HLMI/MI value of 88, an average particle diameter of 30 μ, a bulk density of 0.38 g/cm$^3$ and ethyl branches of 2 (/1000 carbon atoms). The activity per gram of the solid catalyst component ($A^7$) was 46,000 g/g.

Example 13

(a) Preparation of Solid Catalyst Component ($A^8$)

A catalyst was prepared in the same manner as in Example 1, except using 12.8 g of dimethylpolysiloxane (0.173 g atom of silicon; about 200 centistokes of viscosity at 25° C.) instead of tetraethoxysilane and tetramethoxysilane of Example 1. The elementary analysis values of the resulting solid catalyst component ($A^8$) were 8.3 wt. % of Ti and 7.5 wt. % of Zr.

(b) Pre-polymerization

The pre-polymerization of the solid catalyst component ($A^8$) prepared in said step (a) was carried out in the same manner as Example 10.

(c) Polymerization

The copolymerization of ethylene and 1-butene was carried out in the same manner as Example 10 using the pre-polymerized catalyst prepared in said step (b).

As the result, there is obtained 178 g of polyethylene having a melt index of 0.18 g/10 min., a HLMI/MI value of 85, an average particle diameter of 320 μ, a bulk density of 0.39 g/cm³ and ethyl branches of 18 (/1000 carbon atoms). The activity per gram of the solid catalyst component ($A^8$) was 43,000 g/g.

Comparative Example 2

(a) Preparation of Solid Catalyst Component

A catalyst was prepared in the same manner as in Example 10, except not adding tetraethoxysilane and tetramethoxysilane of Example 1. The elementary analysis values of the resulting solid catalyst component were 8.2 wt. % of Ti and 7.2 wt. % of Zr.

(b) Pre-polymerization

The pre-polymerization of the solid catalyst component prepared in said step (a) was carried out in the same manner as in Example 10.

(c) Polymerization

The copolymerization of ethylene and 1-butene was carried out in the same manner as in Example 10 using the pre-polymerized catalyst prepared in said step (b).

As a result, there was obtained 135 g of polyethylene having a melt index of 0.26 g/10 min., a HLMI/MI value of 78, an average particle diameter of 120 μ, a bulk density of 0.29 g/cm³ and ethyl branches of 20 (/1000 carbon atoms). The activity per gram of the solid catalyst component was 42,000 g/g.

On the other hand, ethylene-α-olefin copolymer obtained by using the catalyst system comprising a solid catalyst component mainly consisting of vanadium and an organometallic compound has a narrower molecular weight distribution range and composition distribution range than that obtained by a titanium-based catalyst, and is fairly improved in stickiness and transparency. However, it is insufficient for the desired use, as well as having a remarkably low polymerization activity.

Example 14

(a) Preparation of Solid Catalyst Component ($A^9$)

In a 3-liter glass flask equipped with a stirrer, 25.0 g (1.03 mole) of metallic magnesium powder and 197.4 g (0.41 mole) of zirconium tetrabutoxide were charged, and then 167.7 g (2.26 mole) of n-butanol in which 1.25 g of iodine was dissolved was gradually added thereto at 90° C. for 2 hours. The mixture was further stirred at 140° C. for 2 hours under nitrogen seal while discharging the generated hydrogen gas. After elevating the temperature to 110° C., 42.9 g (0.21 mole) of tetraethoxysilane and 31.3 g (0.21 mole) of tetramethoxysilane were added to the reaction solution, and then stirred at 140° C. for 2 hours, followed by adding 1750 ml of hexane to give a homogeneous solution containing Mg and Zr.

In another 500-ml glass flask, 95.0 g of the homogeneous solution (corresponding to 0.058 mole of Mg) was charged, and the solution temperature was adjusted to 45° C. In the mixed solution, 129 ml of hexane solution containing 0.35 mole of i-butylaluminum dichloride was gradually added for 2 hours. Then, the temperature was elevated to 70° C., and the mixture was stirred at 70° C. for 1 hour. After removal of supernatant from the mixture and drying, a part of the resultant was collected. The elementally analysis value of the resultant was 14.1 wt. % of Zr.

Next, 5.0 g of the solid component was charged into a 300-liter of glass flask, and then 20 ml of toluene and 0.23 g (0.77 millimole) of bis(cyclopentadienyl) zirconium dichloride were added thereto, followed by stirring at 30° C. for 1 hour. Then, the mixture was evaporated under reduced pressure using evaporator to remove toluene therefrom. Hexane was added to the reaction product, and the mixture was washed 7 times by decantation. A slurry of the solid catalyst component ($A^9$) suspended in hexane was thus obtained in this manner. A part of the slurry was collected, and supernatant was removed therefrom, followed by drying under nitrogen atmosphere. The elementary analysis value of the resultant was 16.9 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 5.8 mg atom (converted to aluminum atom) of methylaluminoxane as the catalyst component (B) and the slurry containing 10.7 mg of the solid catalyst component ($A^9$) prepared in said step (a) were successively charged into the autoclave. After adjusting the inside pressure of the autoclave to 1 kg/cm²G, polymerization was carried out for 1.5 hours while adding ethylene continuously so that the inside pressure of the autoclave became 7.0 kg/cm²G. After completion of the polymerization, the reaction mixture was cooled to expel the unreacted gas, and the resulting polyethylene was separated from the solvent by filtration, followed by drying, to give 276 g of polyethylene having a melt index of 0.01 g/10 min. and a HLMI/MI value of 150. The activity was corresponded to 25,800 g/g. The weather-resistant time was 1,800 hours.

Example 15

(a) Pre-polymerization

The inside atmosphere of a 2-liter capacity stainless steel autoclave of the electromagnetic stirring type was sufficiently replaced by nitrogen, and 2.12 g of solid catalyst component ($A^9$) prepared in step (a) of Example 4 suspended in 400 ml of hexane was charged therein. Subsequently, 0.22 g (2.0 millimoles) of triethylaluminum as the component (B) was charged into the autoclave. Then, propylene was supplied while maintaining the inside temperature and the inside pressure of the autoclave to 30° C. and 1 to 2 kg/cm²G, respectively, so that 21.2 g of propylene was reacted and pre-polymerized with the solid catalyst component ($A^9$). According to this procedure, 10.0 g of propylene per gram of the solid catalyst component ($A^9$) was taken up. Hexane was added to the reaction product, and the resulting mixture was washed 7 times by decantation, to give a pre-polymerized catalyst suspended in hexane.

(b) Polymerization

The copolymerization of ethylene and 1-butene was carried out by the gas phase method using the pre-polymerized catalyst prepared in said step (a). That is, the inside atmosphere of a 2-liter capacity stainless steel autoclave of the electromagnetic stirring type was sufficiently replaced by nitrogen, and 200 g of table salt dried at 200° C. for 30 min. was charged therein as a dispersing medium for the catalyst, and the inside temperature was adjusted to 80° C. Then, 5.2 mg atom (converted to aluminum atom) of methylaluminoxane as the component (B) and 102.3 mg of the pre-polymerized catalyst prepared in said step (a) (containing 9.3 mg of the solid catalyst component ($A^1$)) were successively charged into the autoclave. After adjusting the inside pressure of the autoclave to 1 kg/cm²G by nitrogen, polymerization was carried out for 1.5 hours while adding ethylene and butene-1 continuously so that the inside pressure of the autoclave became 17.0 kg/cm²G and adjusting butene-1/ethylene value (molar ratio) in the gas phase to 0.20. After completion of the polymerization, the reaction mixture was cooled to expel the unreacted gas, to give a mixture of produced polymer and salt. Then, the mixture was washed with pure water to dissolve out the salt, followed by drying, to give 215 g of polyethylene having a melt index of 0.50 g/10 min., a HLMI/MI value of 86 and ethyl branches 19 (/1000 carbon atoms). The activity per gram of solid catalyst component ($A^9$) was 23,100 g/g. The weather-resistant time was 2,000 hours.

Example 16

(a) Preparation of Solid Catalyst Component ($A^{10}$)

In a 300-ml of glass flask, 5.0 g of the solid component prepared in Example 14 was charged, and then 100 ml of toluene and 1.15 g (3.9 millimoles) of bis(cyclopentadienyl)zirconium dichloride were added thereto, followed by stirring at 30° C. for 1 hour. Then, the mixture was evaporated under reduced pressure using an evaporator to remove toluene therefrom. Hexane was added to the reaction product, and the mixture was washed 7 times by decantation. A slurry of solid catalyst component ($A^{10}$) suspended decantation. A slurry of solid catalyst component ($A^{10}$) suspended in hexane was thus obtained in this manner. A part of the slurry was collected, and supernatant removed therefrom, followed by drying under nitrogen atmosphere. The elementary analysis value of the resultant was 20.2 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 1.3 mg atom (converted to aluminum atom) of methylaluminoxane as the catalyst component (B) and the slurry containing 2.9 mg of solid catalyst component ($A^{10}$) prepared in said (a) were successively charged into the autoclave. After adjusting the inside pressure of the autoclave to 1 kg/cm²G, polymerization was carried out for 1.5 hours while adding ethylene continuously so that the inside pressure of the autoclave became 7.0 kg/cm²G. After completion of the polymerization, the reaction mixture was cooled to expel the unreacted gas, and the resulting polyethylene was separated from the solvent by filtration, followed by drying, to give 130 g of polyethylene having a melt index of 0.04 g/10 min. and a HLMI/MI value of 141. The activity was 44,700 g/g. The weather-resistant time was 1,800 hours.

Example 17

(a) Pre-polymerization

The pre-polymerization of solid catalyst component ($A^{10}$) prepared in Example 16 was carried out in the same manner as in Example 15.

(b) Polymerization

The copolymerization of ethylene and 1-butene was carried out in the same manner as in Example 15 using the pre-polymerized catalyst prepared in said step (a).

As a result, there was obtained 116 g of polyethylene having a melt index of 1.3 g/10 min., a HLMI/MI value of 72 and ethyl branches of 23 (/1000 carbon atoms). The activity per gram of solid catalyst component ($A^{10}$) was 33,000 g/g. The weather-resistant time was 1,900 hours.

Comparative Example 3

(a) Preparation of Catalyst

In a 500-ml glass flask, 0.066 mole (converted to Mg) of the homogeneous solution prepared in step (a) of Example 14 was charged, and the temperature of the solution was adjusted to 45° C., and then 152 ml of 50 % hexane solution of i-butylaluminum dichloride (0.4 mole) was gradually added for 2 hours. Then, the temperature was elevated to 70° C., and the mixed solution was stirred at 70° C. for 1 hour, to give a solid catalyst component. Hexane was added to the solid catalyst component, and the resulting mixture was washed 7 times by decantation. To the resultant, 26.5 g (0.14 mole) of titanium tetrachloride was added, and the temperature of the mixture was elevated, and then the mixture was reacted at 70° C. for 1 hour. Hexane was added to the reaction product, and washed 7 times, to give a solid catalyst. A part of the reaction product was collected, and the supernatant was removed therefrom, followed by drying under nitrogen atmosphere. The elementary analysis values of the resultant were 7.9 wt. % of Ti and 6.8 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 0.258 g of tri-i-butylaluminum as catalyst component (B) and the slurry containing 31 mg of the solid catalyst given in said step (a) were successively charged into the autoclave. After adjusting the inside pressure of the autoclave to 1 kg/cm²G, 13.3 kg/cm² of hydrogen was charged, and then polymerization was carried out for 1.5 hours while adding ethylene continuously so that the inside pressure of the autoclave became 20.0 kg/cm²G. After completion of the polymerization, the reaction mixture was cooled to expel the unreacted gas, and the resulting polyethylene was separated from the solvent by filtration, followed by drying, to give 371 g of polyethylene having a melt index of 0.16 g/10 min. and a HLMI/MI value of 102. The activity was corresponded to 11,800 g/g. The weather-resistant time was 1,500 hours.

Comparative Example 4

(a) Preparation of Catalyst

Into a 1-liter glass flask equipped with a stirring apparatus, 7.0 g (0.288 mole) of metallic magnesium powder and 49.0 g (0.144 mole) of titanium tetrabutoxide were charged, and 44.8 g {0.60 mole) of n-butanol in which 0.35 g of iodine was dissolved was gradually added at 90° C. for 2 hours, followed by further stirring at 140° C. for 2 hours under nitrogen seal while discharging generated hydrogen. After cooling the mixed solution to 110° C., 18 g (0.086 mole) of tetraethoxysilane and 13.2 g (0.086 mole) of tetramethoxysilane were added thereto, and further stirred at 140° C. for 2 hours. Then, 490 ml of hexane was added to the mixed solution to give a Mg-Ti solution.

Into another 500-ml of glass flask, 96.8 g (corresponding to 0.058 moles of Mg) was charged, and then 63 ml of hexane solution containing 0.17 mole of i-butylaluminum dichloride was added thereto, followed by stirring at 70° C. for 1 hour. Hexane was added to the reaction product, and the mixture was washed 7 times by decantation. A slurry of solid complex suspended in hexane was thus obtained in this manner. A part of the slurry was collected, supernatant was removed therefrom, followed by drying under nitrogen atmosphere. The elementary analysis value of the resultant was 11.1 wt. % of Ti.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 0.23 g (1.2 millimoles) of tri-i-butylaluminum as catalyst component (B) and the slurry containing 7.1 mg of the catalyst component given in said step (a) were successively charged into the autoclave. After adjusting the inside pressure of the autoclave to 1 kg/cm²G, 4 kg/cm² of hydrogen was charged, and then polymerization was carried out for 1.5 hours while adding ethylene continuously so that the inside pressure of the autoclave became 11.0 kg/cm²G. After completion of the polymerization, the reaction mixture was cooled to expel the unreacted gas, and the resulting polyethylene was separated from the solvent by filtration, followed by drying, to give 273 g of polyethylene having a melt index of 0.8 g/10 min. and a HLMI/MI value of 34. The activity was 38,400 g/g. The weather-resistant time was 1,500 hours.

Example 18

(a) Preparation of Solid Catalyst Component ($A^{11}$)

Into a 1-liter glass flask equipped with a stirring apparatus, 7.0 g (0.288 mole) of metallic magnesium powder and 49.0 g (0.144 mole) of titanium tetrabutoxide were charged, and 44.8 g ! 0.60 mole) of n-butanol in which 0.35 g of iodine was dissolved was gradually added at 90° C. for 2 hours, followed by further stirring at 140° C. for 2 hours under nitrogen seal while discharging generated hydrogen. After cooling the mixed solution to 110° C., 8 g (0.086 mole) of tetraethoxysilane and 3.2 g (0.086 mole) of tetramethoxysilane were added thereto, and further stirred at 140° C. for 2 hours. Then, 490 ml of hexane was added to the mixed solution to give a homogeneous solution containing Mg and transition metal.

Into another 500-ml of glass flask, 95.2 g (corresponding to 0.057 moles of Mg) of the homogeneous solution was charged, and then 4.2 g (0.014 mole) of bis(cyclopentadienyl)zirconium dichloride was charged therein. After dissolving the mixture, 127 ml of hexane solution containing 0.34 mole of i-butylaluminum dichloride was added thereto, followed by stirring at 70° C. for 1 hour. After removing supernatant from the resultant and drying under nitrogen atmosphere, 3.9 g of the resulting solid catalyst component was charged into a 300 ml glass flask, and then 31.3 g of toluene solution comprising 115 ml of toluene and methylaluminoxane (0.091 mole converted to aluminum atom) was added thereto, followed by stirring at 30° C. for 1 hour. Then, the resulting mixture was evaporated to remove toluene therefrom using an evaporator. Hexane was added to the reaction product, and the resulting mixture was washed 7 times by decantation. A slurry of solid catalyst component ($A^{11}$) suspended in hexane was thus obtained in this manner. A part of the slurry was collected, and supernatant removed, followed by drying under nitrogen atmosphere. The elementary analysis values of the resultant were 3.1 wt. % of Ti and 4.0 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 2.3 mg atom (converted to aluminum atom) of methylaluminoxane as the catalyst component (B) and the slurry containing 10.7 mg of solid catalyst component (A) prepared in said step (a) were successively charged into the autoclave to 1 kg/cm²G, 4 kg/cm² of hydrogen was added, and then polymerization was carried out for 1.5 hours while adding ethylene continuously so that the inside pressure of the autoclave became 11.0 kg/cm²G. After completion of the polymerization, the reaction mixture was cooled to expel the unreacted gas, and the resulting polyethylene was separated from the solvent by filtration, followed by drying, to give 440 g of polyethylene having a melt index of 0.03 g/10 min., a HLMI/MI value of 109, an average particle diameter of 350 μ, a fine particle content of 1.5 wt. % and a bulk density of 0.35 g/cm³. The activity was 41,000 g/g.

Example 19

(a) Polymerization

The polymerization was carried out in the same manner as in Example 18, except using 0.08 g (0.4 millimole) of tri-i-butylaluminum and 1.8 mg atom (converted to aluminum atom) of methylaluminoxane instead of methylaluminoxane as catalyst component (B) and using 11.2 mg of solid catalyst component ($A^1$).

As a result, there was obtained 231 of polyethylene having a melt index of 0.26 g/10 min., a HLMI/MI value of 44, an average particle diameter of 380 μ, a fine particle content of 1.2 wt. % and a bulk density of 0.34 g/cm³. The activity was 21,000 g/g.

Example 20

(a) Pre-polymerization

The inside atmosphere of a 2-liter capacity stainless steel autoclave of the electromagnetic stirring type was sufficiently replaced by nitrogen, and 2.02 g of solid catalyst component ($A^{11}$) prepared in step (a) of Example 18 suspended in 400 ml of hexane was charged therein. Subsequently, 0.44 g (3.9 millimoles) of triethylaluminum as the component (B) was added to the autoclave. Then, propylene was supplied while maintaining the inside temperature and the inside pressure of the autoclave to 30° C. and 1 to 2 kg/cm$^2$G, respectively, so that 20.2 g of propylene was reacted and pre-polymerized with solid catalyst component ($A^1$). According to this procedure, 10.0 g of propylene per gram or solid catalyst component ($A^{11}$) was taken up. Hexane was added to the reaction product, and the resulting mixture was washed 7 times by decantation, to give a pre-polymerized catalyst suspended in hexane.

(b) Polymerization

The copolymerization of ethylene and 1-butene was carried out by the gas phase method using the pre-polymerized catalyst prepared in said step (a). That is, the inside atmosphere of a 2-liter capacity stainless steel autoclave of the electromagnetic stirring type was sufficiently replaced by nitrogen, and 200 g of table salt dried at 200° C. for 30 min. was charged therein as a dispersing medium for the catalyst, and the inside temperature was adjusted to 80° C. Then, 2.4 mg atom (converted to aluminum atom) of methylaluminoxane as the component (B) and 40.1 mg of the pre-polymerized catalyst prepared in said step (a) (containing 3.6 mg of solid catalyst component ($A^1$)) were successively charged into the autoclave. After adjusting the inside pressure of the autoclave to 1 kg/cm$^2$G by nitrogen, 2.0 kg/cm$^2$ of hydrogen was added thereto, and then polymerization was carried out for 1.5 hours while adding ethylene and butene-1 continuously so that the inside pressure of the autoclave became 19.0 kg/cm$^2$G, and adjusting butene-/ethylene value (molar ratio) in the gas phase to 0.20. After completion of the polymerization, the reaction mixture was cooled to expel the unreacted gas, to give a mixture of produced polymer and salt. Then, the mixture was washed with pure water to dissolve out the salt, followed by drying, to give 126 g of polyethylene having a melt index of 0.23 g/10 min., a HLMI/MI value of 85, an average particle diameter of 400 μ, a fine particle content of 0.7 wt. %, a bulk density of 0.39 g/cm$^3$ and ethyl branches of 21 (/1000 carbon atoms). The activity per gram of solid catalyst component ($A^{11}$) was 35,000 g/g.

Example 21

(a) Preparation of Solid Catalyst Component ($A^{12}$)

Into a 1-liter glass flask equipped with a stirring apparatus, 7.0 g (0.288 mole) of metallic magnesium powder and 49.0 g (0.144 mole) of titanium tetrabutoxide were charged, and 44.8 g (0.60 mole) of n-butanol in which 0.35 g of iodine was dissolved was gradually added at 90° C. for 2 hours, followed by further stirring at 140° C. for 2 hours under nitrogen seal while discharging generated hydrogen. Then, 490 ml of hexane was added to the mixed solution to give a homogeneous solution containing Mg and a transition metal.

Into another 500-ml glass flask, 92.1 g (corresponding to 0.055 moles of Mg) of the homogeneous solution was charged, and then 4.0 g (0.014 mole) of bis(cyclopentadienyl)zirconium dichloride was charged thereinto. After dissolving the mixture, 123 ml of hexane solution containing 0.33 mole of i-butylaluminum dichloride was added thereto, followed by stirring at 70° C. for 1 hour. After removing supernatant from the resultant and drying under nitrogen atmosphere, toluene and methylaluminoxane were added to the solid catalyst component, followed by stirring at 30° C. for 1 hour. Then, the resulting mixture was evaporated to remove toluene therefrom using an evaporator. Hexane was added to the reaction product, and the resulting mixture was washed 7 times by decantation. A slurry of solid catalyst component ($A^{12}$) suspended in hexane was thus obtained in this manner. A part of the slurry was collected, and supernatant removed, followed by drying under nitrogen atmosphere. The elementary analysis values of the resultant were 2.9 wt. % of Ti and 2.5 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 2.2 mg atom (converted to aluminum atom) of methylaluminoxane as catalyst component (B) and the slurry containing 9.5 mg of solid catalyst component ($A^{12}$) prepared in said step (a) were successively charged into the autoclave. After adjusting the inside pressure of the autoclave to 1 kg/cm$^2$G, 4 kg/cm$^2$ of hydrogen was added, and then polymerization was carried out for 1.5 hours while adding ethylene continuously so that the inside pressure of the autoclave became 11.0 kg/cm$^2$G. After completion of the polymerization, the reaction mixture was cooled to expel the unreacted gas, and the resulting polyethylene was separated from the solvent by filtration, followed by drying, to give 409 g of polyethylene having a melt index of 1.50 g/10 min., a HLMI/MI value of 132, an average particle diameter of 330 μ, a fine particle content of 1.7 wt. % and a bulk density of 0.31 g/cm$^3$. The activity was 43,000 g/g.

Example 22

(a) Pre-polymerization

The pre-polymerization of solid catalyst component ($A^{12}$) given in step (a) of Example 21 was carried out in the same manner as step (a) of Example 20.

(b) Polymerization

The copolymerization of ethylene and 1-butene was carried out by the gas phase method using the pre-polymerized catalyst prepared in said step (a). That is, the inside atmosphere of a 2-liter capacity stainless steel autoclave of the electromagnetic stirring type was sufficiently replaced by nitrogen, and 200 g of table salt dried at 200° C. for 30 min. was charged thereinto as a dispersing medium for the catalyst, and the inside temperature was adjusted to 80° C. Then, 0.44 g (2.2 millimole) of tri-i-butylaluminum as component (B) and 38.3 mg of the pre-polymerized catalyst given in said step (a) (containing 3.5 mg of the solid catalyst component ($A^{12}$)) were successively charged into the autoclave. After adjusting the inside pressure of the autoclave to 1 kg/cm$^2$G by nitrogen, 2.0 kg/cm$^2$ of hydrogen was added thereto, and then polymerization was carried out for 1.5 hours while adding ethylene and butene-1 continuously so that the inside pressure of the autoclave became 19.0 kg/cm²G, and adjusting butene-1/ethylene value (molar ratio) in the gas phase to 0.20. After completion of the polymerization, the reaction mixture was cooled to expel the unreacted gas, to give a mixture of produced polymer and salt. Then, the mixture was washed with pure water to dissolve out the salt, followed by drying, to give 84 g of polyethylene having a melt index of 0.28 g/10 min., a HLMI/MI value of 50, an average particle diameter of 380 μ, a fine particle content of 0.9 wt. %, a bulk density of 0.37 g/cm³ and ethyl branches of 26 (/1000 carbon atoms). The activity per gram of solid catalyst component ($A'''2$) was 24,000 g/g.

Comparative Example 5

(a) Preparation of Catalyst

Into a 500-ml of glass flask, 97.5 g (corresponding to 0.059 mole of Mg) of the homogeneous solution containing Mg and a transition metal given in step (a) of Example 21 was charged, and 4.4 g (0.015 mole) of bis(cyclopentadienyl)zirconium dichloride was charged thereinto, followed by dissolving completely to give a homogeneous solution. Then, 86 ml of hexane solution containing 0.23 mole of i-butylaluminum dichloride was added to the homogeneous solution, followed by stirring at 70° C. for 1 hour. Hexane was added to the reaction product, and the resulting mixture was washed 7 times by decantation. A slurry of a solid catalyst component suspended in hexane was thus obtained in this manner. A part of the slurry was collected, and supernatant removed, followed by drying under nitrogen atmosphere. The elementary analysis values of the resultant was 7.9 wt. % of Ti and 6.8 wt. % of Zr.

(b) Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. Then, 1.5 mg atom (converted to aluminum atom) of methylaluminoxane as catalyst component (B) and the slurry containing 3.1 mg of the catalyst component given in said step (a) were successively charged onto the autoclave. After adjusting the inside pressure autoclave to 1 kg/cm²G, 4 kg/cm² of hydrogen was charged, and then polymerization was carried out for 1.5 hours while adding ethylene continuously so that the inside pressure of the autoclave became 11.0 kg/cm²G. After completion of the polymerization, the reaction mixture was cooled to expel the unreacted gas, and the resulting polyethylene was separated from the solvent by filtration, followed by drying, to give 257 g of polyethylene having a melt index of 0.04 g/10 min., a HLMI/MI value of 64, an average particle diameter of 110 μ and a bulk density of 0.26 g/cm³. The activity was 83,000 g/g.

Example 23

(a) Preparation of Solid Catalyst Component ($A^{13}$)

Into a 1-liter glass flask equipped with stirrer, 10.0 g (0.412 mole) of metallic magnesium powder and 56.1 g (0.103 mole) of tetrakis(2-ethylhexoxy) silane were charged, and then 70.2 g (0.948 mole) of n-butanol in which 0.5 g of iodine was dissolved was gradually added thereto at 100° C. for 2 hours. The mixture was further stirred at 140° C. for 2 hours under nitrogen seal while discharging the generated hydrogen gas. Then, 680 ml of decane and 23 ml of 30 wt. % diethylaluminum chloride solution were added to the resulting mixture to give a Mg-Si solution.

Into another 500-ml glass flask, 123.6 g of the Mg-Ti solution (corresponding to 0.074 mole of Mg) was charged, and then 3.0 g (7.5 millimole) of bis(n-butyl-cyclopentadienyl)zirconium dichloride was charged therein, followed by dissolving completely to give a homogeneous solution. Further, in the homogeneous solution, 46 ml of hexane solution containing 0.149 mole of i-butylaluminum dichloride was added, followed by stirring at 70° C. for 1 hour. Hexane was added to the reaction product, and the resulting mixture was washed 7 times by decantation. A slurry of solid catalyst component ($A^{13}$) suspended in hexane was thus obtained in this manner. A part of the slurry was collected, and the supernatant removed, followed by drying under nitrogen atmosphere. The elementary analysis value of the resultant was 4.3 wt. % of Zr.

(b) Pre-polymerization

The inside atmosphere of a 2-liter capacity stainless steel autoclave of the electromagnetic stirring type was sufficiently replaced by nitrogen, and 1.66 g of solid catalyst component ($A^{13}$) obtained in said step (a) suspended in 400 ml of hexane was charged thereinto. Subsequently, 54.8 mg atom (converted to aluminum atom) of methylaluminoxane as the component (B) was charged into the autoclave. Then, ethylene was supplied while maintaining the inside temperature and the inside pressure of the autoclave at 30° C. and 1 to 2 kg/cmG, respectively, so that 20 g of ethylene was reacted and pre-polymerized with solid catalyst component ($A^{13}$). According to this procedure, 20 g of ethylene per gram of solid catalyst component ($A^{13}$) was taken up. Hexane was added to the reaction product, and the resulting mixture was washed 7 times by decantation, to give a pre-polymerized catalyst suspended in hexane.

(c) Polymerization

The polymerization of ethylene was carried out by the gas phase method using the pre-polymerized catalyst given in said step (b). That is, the inside atmosphere of a 2-liter capacity stainless steel autoclave of the electromagnetic stirring type was sufficiently replaced by nitrogen, and 200 g of table salt dried at 200° for 30 min. was charged therein as a dispersing medium for the catalyst, and the inside temperature was adjusted to 80° C. Then 1.75 mg atom (converted to aluminum atom) of methylaluminoxane as the component (B) and 0.0028 g atom (converted to zirconium) of the pre-polymerized catalyst obtained in said step (b) were successively charged into the autoclave. After adjusting the inside pressure of the autoclave to 1 kg/cm²G by nitrogen, 50 Nml of hydrogen was charged. Then polymerization was carried out for 1.5 hours while adding ethylene continuously so that the inside pressure of the autoclave became 8.0 kg/cm²G. After completion of the polymerization, the reaction mixture was cooled to expel the unreacted gas, to give a mixture of produced polymer and salt. Then, the mixture was washed with pure water to dissolve out the salt, followed by drying, to give 181 g of polyethylene having a melt index of 0.45 g/10 min., an average particle diameter of 340 μ and an apparent density of 0.40 g/cm³.

Example 24

Polymerization

The copolymerization of ethylene and 1-butene was carried out by the gas phase method using the pre-polymerized catalyst given in Example 23. That is, the inside atmosphere of a 2-liter capacity stainless steel autoclave of the electromagnetic stirring type was sufficiently replaced by nitrogen, and 200 g of table salt dried at 200° C. for 30 min was charged therein as a dispersing medium for the catalyst, and the inside temperature was adjusted to 80° C. Then, 1.50 mg atom (converted to aluminum atom) of methylaluminoxane as the component (B) and 0.0033 g atom (converted to zirconium) of the pre-polymerized catalyst obtained in Example 1 were successively charged into the autoclave. After adjusting the inside pressure of the autoclave to 1 kg/cm$^2$G by nitrogen, 50 Nml of hydrogen was charged. Then polymerization was carried out for 1.5 hours while adding ethylene and 1-butene continuously so that the inside pressure of the autoclave became 8.0 kg/cm$^2$G, and adjusting 1-butene/ethylene (molar ratio) in the gas phase of 0.10. After completion of the polymerization, the reaction mixture was cooled to expel the unreacted gas, to give a mixture of produced polymer and salt. Then, the mixture was washed with pure water to dissolve out the salt, followed by drying, to give 224 g of polyethylene having a melt index of 2.53 g/10 min., an average particle diameter of 380 μ, a bulk density of 0.39 g/cm$^3$ and a density of 0.917 g.cm$^3$.

Example 25

(a) Preparation of Solid Catalyst Component ($A^{14}$)

Into a 1-liter glass flask equipped with stirrer, 10.0 g (0.412 mole) of metallic magnesium powder, 38 ml of n-butanol and 126.1 g (0.617 mole) of aluminum tri-isopropoxide were charged, and then 91.5 (1.235 moles) of n-butanol in which 0.5 of iodine was dissolved was gradually added thereto at 80° C. for 1 hour. The mixture was further stirred a reflux temperature for 4 hours under nitrogen seal while discharging the generated hydrogen gas. A Mg-Al solution was thus obtained.

Into another 500-ml glass flask, 58.4 g of the Mg-Al solution (corresponding to 0.093 mole of Mg) was charged, and then 3.8 g (9.3 millimoles) of bis(n-butylcyclopentadienyl)zirconium dichloride was charged therein, followed by dissolving completely to give a homogenous solution. Further, in the homogenous solution, 69 ml of hexane solution containing 0.185 mole of i-butylaluminum dichloride was added, followed by stirring at 70° C. for 1 hour. Hexane was added to the reaction product, and the resulting mixture was washed 7 times by decantation. A slurry of solid catalyst component ($A^{14}$) suspended in hexane was thus obtained in this manner. A part of the slurry was collected, and the supernatant removed, followed by drying under nitrogen atmosphere. The elementary analysis value of the resultant was 3.1 wt. % of Zr.

(b) Pre-polymerization

The pre-polymerization of solid catalyst component ($A^{14}$) given in said step (a) was carried out in the same manner as step (b) of Example 23.

(c) Polymerization

The gas phase polymerization of ethylene was carried out using the pre-polymerized catalyst given in said step (b). That is, the inside atmosphere of a 2-liter capacity stainless steel autoclave of the electromagnetic stirring type was sufficiently replaced by nitrogen, and 200 g of table salt dried at 200° C. for 30 min. was charged therein as a dispersing medium for the catalyst, and the inside temperature was adjusted to 80° C. Then, 1.75 mg atom (converted to aluminum atom) of methylaluminoxanes as the component (B) and 0.0036 g atom (converted to zirconium) of the pre-polymerization catalyst given in said step (b) were successively charged into the autoclave. After adjusting the inside pressure of the autoclave to 1 kg/cm$^2$G by nitrogen, 50 Nml of hydrogen was charged. Then polymerization was carried out for 1.5 hours while adding ethylene continuously so that the inside pressure of the autoclave became 8.0 kg/cm$^2$G. After completion of the polymerization, the reaction mixture was cooled to expel the unreacted gas, to give a mixture of produced polymer and salt. Then, the mixture was washed with pure water to dissolve out the salt, followed by drying, to give 180 g of polyethylene having a melt index of 0.32 g/10 min., an average particle diameter of 370 μ and a bulk density of 0.39 g/cm$^3$.

Example 26

Polymerization

The copolymerization of ethylene and 1-butene was carried out by the gas phase method using the pre-polymerized catalyst given in Example 25. That is, the inside atmosphere of a 2-liter capacity stainless steel autoclave of the electromagnetic stirring type was sufficiently replaced by nitrogen, and 200 g of table salt dried at 200° C. for 30 min. was charged therein as a dispersing medium of the catalyst, and the inside temperature was adjusted to 80° C. Then, 1.86 mg atom (converted to aluminum) of methylaluminoxane and 0.0032 mg atom (converted to zirconium atom) of the pre-polymerized catalyst given in step (b) of Example 25 were successively charged into the autoclave. After adjusting the inside pressure of the autoclave to 1 kg/cm$^2$G by nitrogen, 50 Nml of hydrogen was charged. Then polymerization was carried out for 1.5 hours while adding ethylene and 1-butene continuously so that the inside pressure of the autoclave became 8.0 kg/cm$^2$G, and adjusting 1-butene/ethylene (molar ratio) in gas phase to 0.10. After completion of the polymerization, the reaction mixture was cooled to expel the unreacted gas, to give a mixture of produced polymer and salt. Then, the mixture was washed with pure water to dissolve out the salt, followed by drying, to give 182 g of polyethylene having a melt index of 3.10 g/10 min., an average particle diameter of 380 μ, a bulk density of 0.35 g/cm$^3$ and a density of 0.910 g/cm$^3$.

Example 27

Polymerization

The inside atmosphere of a 2-liter capacity stainless steel autoclave of the electromagnetic stirring type was sufficiently replaced by nitrogen, and 1.2 liters of hexane was charged therein, and the inside temperature was adjusted to 80° C. The, 1.40 mg atom (converted to aluminum atom) of methylaluminoxane as the component (B) and 0.0020 g atom (converted to zirconium) of pre-polymerized catalyst component ($A^{13}$) given in step (a) of Example 23 were successively charged into the autoclave. After adjusting the inside pressure of the autoclave to 1 kg/cmBG by nitrogen, 200 Nml of hydrogen was charged. Then, polymerization was carried out for 1.5 hours while adding ethylene continuously so that the inside pressure of the autoclave became 11.0 kg/cm²G. After completion of the polymerization, the reaction mixture was cooled to expel the unreacted gas. The resultant was separated from solvent by filtration, and dried to give 128 g of polyethylene having a melt index of 1.54 g/10 min.

What is claimed is:

1. A process for producing polyolefins, comprising polymerizing at least one α-olefin in the presence of a catalyst comprising components (A) and (B), wherein component (A) is a solid catalyst component obtained by the steps of:

i) reacting a homogenous solution of (a) metallic magnesium and an alcohol, organosilanol or phenol, or (b) an oxygen-containing compound of magnesium, with at least one oxygen-containing organic compound of a transition metal of the formula $$(Me^1O_a(OR^1)_bX^1_c)_m$$

wherein $R^1$ is a $C_{1-20}$ hydrocarbon group other than cyclopentadienyl, $M^1$ is a transition metal of Groups IVa, Va or VIa in the Periodic Table, $X^1$ is a halogen atom, a, b and c are numbers such that b>0 and 4>c≧0 and a≧0 and compatible with the atomic valence of Me, and m is an integer of from 1 to 6, (ii) dissolving at least one compound of a transition metal of Groups IVa, Va or VIa in the Periodic Table containing cyclopentadienyl as ligand in the resulting solution, (iii) reacting such resulting solution of step (ii) with at least one halogenated organoaluminum compound at a temperature of from −50° C. to 300° C. for 0.5 to 50 hours to precipitate a solid catalyst component and isolating said solid catalyst component, and component (B) comprises an organoaluminum compound other than the halogenated organoaluminum compound used in step (iii).

2. The process for preparing polyolefins according to claim 1, in which a polysiloxane and/or silane is further added in step (iii) of the preparation of said solid catalyst component (A).

3. The process for preparing polyolefins according to claim 1, in which the transition metal in step (i) in the preparation of said solid catalyst component (A), is zirconium.

4. The process for preparing polyolefins according to claim 1, in which at least one organoaluminoxane is further added in step (iii) in the preparation of said solid catalyst component (A).

5. The process for preparing polyolefins according to claim 1, wherein component (B) is an organoaluminoxane.

6. A process for producing polyolefins, comprising polymerizing at least one α-olefin in the presence of a catalyst comprising components (A) and (B), wherein component (A) is a solid catalyst component obtained by the steps of:

(i) reacting a homogenous solution of (a) metallic magnesium and an alcohol, organosilanol or phenol, or (b) an oxygen-containing compound of magnesium, with at least one oxygen-containing organic compound of aluminum or silicon, (ii) dissolving at least one compound of a transition metal of Groups IVa, Va or VIa in the Periodic Table containing cyclopentadienyl as ligand in the resulting solution, (iii) reacting such resulting solution of step (ii) with at least one halogenated organoaluminum compound at a temperature of from −50° C. to 300° C. for 0.5 to 50 hours to precipitate a solid catalyst component and isolating said solid catalyst component, and component (B) comprises an organoaluminum compound other than the halogenated organoaluminum compound used in step (iii).

* * * * *